March 11, 1969  J. H. GAINES ET AL  3,432,611
ELECTRICAL DEVICE MODULINE
Filed June 30, 1966
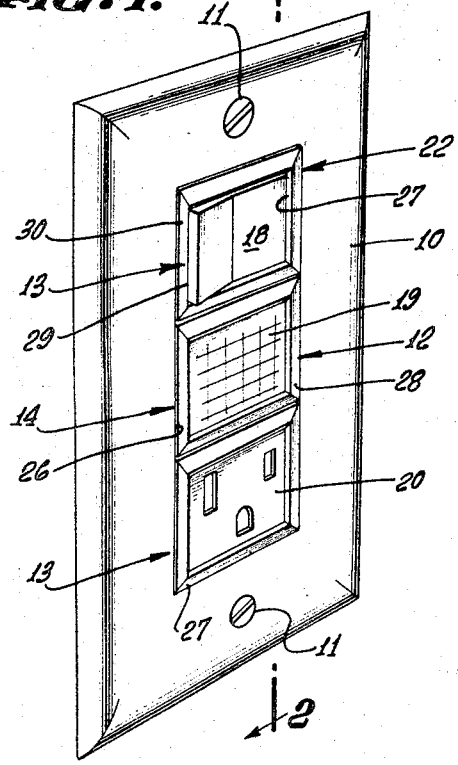
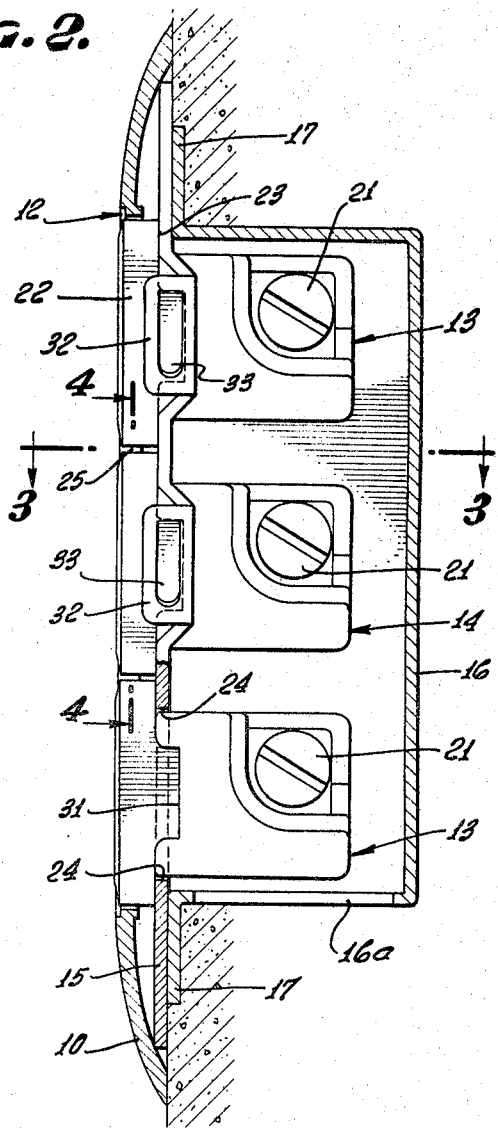
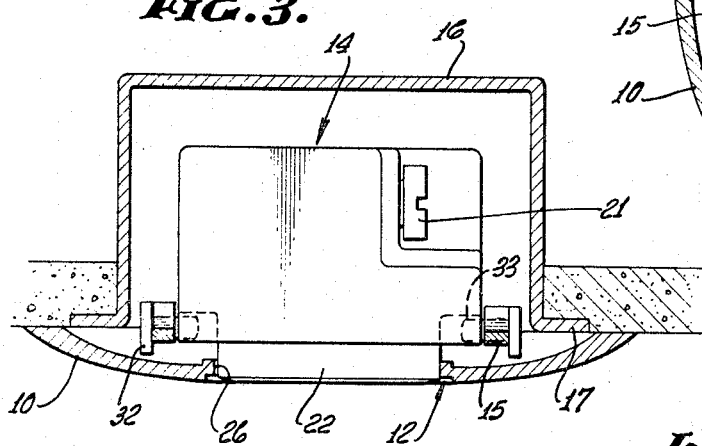
INVENTORS.
JACK H. GAINES
RUSSELL C. EDMISSON
By White & Haefliger
ATTORNEYS.

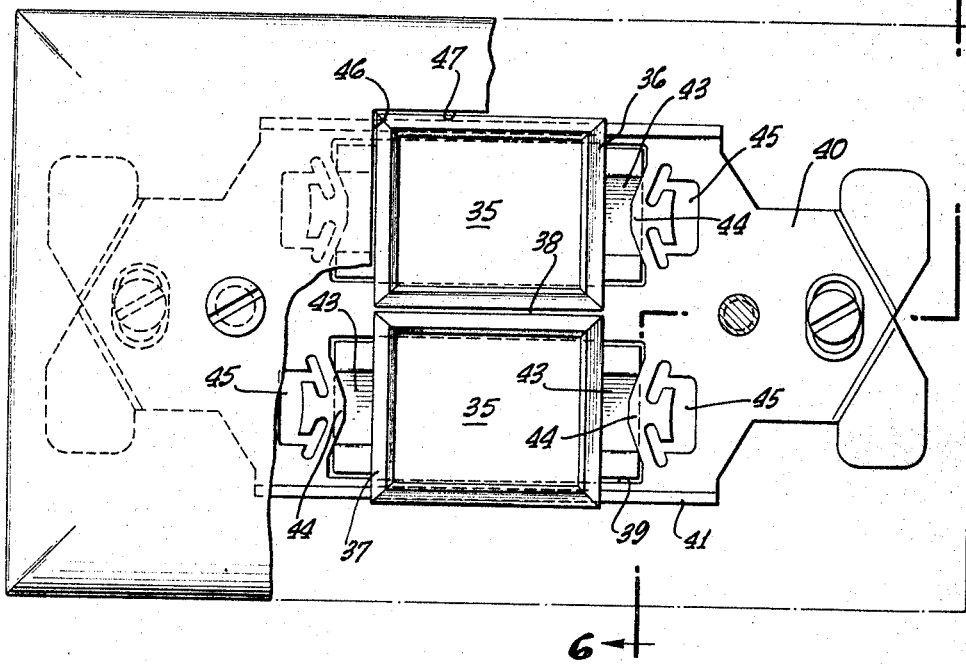
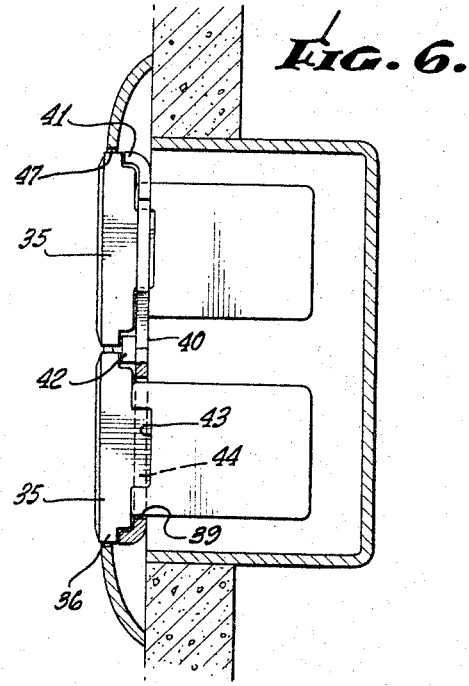
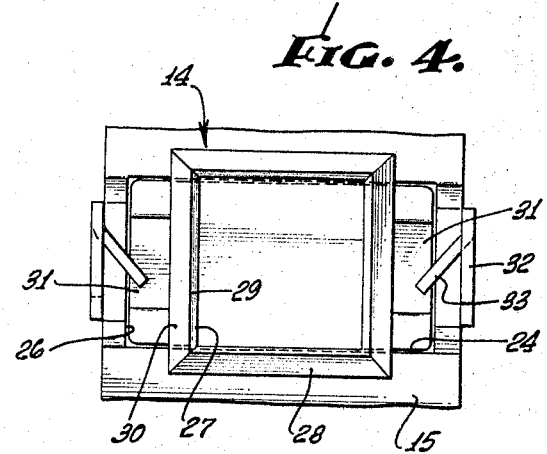
INVENTORS.
JACK H. GAINES
RUSSELL C. EDMISSON
BY White & Haefliger
ATTORNEYS.

United States Patent Office 3,432,611
Patented Mar. 11, 1969

3,432,611
ELECTRICAL DEVICE MODULINE
Jack H. Gaines, Seal Beach, and Russell C. Edmisson, Bellflower, Calif., assignors to Sierra Electric Corporation, Gardena, Calif., a corporation of California
Filed June 30, 1966, Ser. No. 561,960
U.S. Cl. 174—66
Int. Cl. H05k 5/03
8 Claims

ABSTRACT OF THE DISCLOSURE

An electrical device including a face plate having an elongated slot and a series of strap carried electrical device module bodies having flanged rectangular heads aligned in substantially edge-to-edge engagement within the slot to be self-locking against relative shifting within and in the direction of the plane of the face plate.

---

This invention relates to electrical devices for accommodation within wall or face plates, and has to do particularly with new forms and arrangements of electrical device modules within slotted areas of the plates and to strap mountings for the modules in such arrangements.

The invention has for its general object to depart from the conventional forms and arrangements within face plates of electrical devices such as receptacles, switches, illuminated inserts and the like, by accommodating any of such devices within module bodies characterized in having rectangular, most desirably square, exposed or head portions received in alined edge-to-edge interengageability within a continuous elongated face plate slot, so that by reason of their capacity for inter-contact and engagement with edges of the slot, the modules maintain themselves against shifting in the plane of the plate, independently of other support.

More specifically contemplated is the provision of such modules in the form of insulative bodies having flanged square interengageable heads within the plate slot and externally recessed to define areas or spaces within the bodies to receive electrical devices which may correspond or vary in kind subject to selection.

The invention further provides for simple and secure strap mounting of the modules by accommodating their bodies within openings in the strap and forming the bodies with lateral shoulders to be overlapped by bendable strap tabs to securely lock the modules against withdrawal from the plate.

All the various features and objects of the invention as well as the details of ilustrative embodiments, will appear more fully from the following detailed description of the accompanying drawings, in which:

FIG. 1 is a perspective illustration of a face plate containing the modular inserts;

FIG. 2 is a cross section taken on line 2—2 of FIG 1;

FIG. 3 is a transverse cross section on line 3—3 of FIG 2;

FIG. 4 is a fragmentary section taken on line 4—4 of FIG. 2;

FIG. 5 is a view showing in elevation a variational form of the invention with a portion of the face plate braken away to expose the structure beneath; and FIG. 6 is a section taken on line 6—6 of FIG. 5.

The invention comprises a general combination of a face plate 10 mountable to a wall surface as by screws 11 and having a centralized elongated slot 12 containing end modules 13 and an intermediate module 14. The module series is carried by a strap 15 for accommodation within a wall box 16 as by attachment of the strap terminals by suitable means, not shown, to the box flanges 17. The modules 13 and 14 individually are bodies of electrically insulative material cavitated through their heads or exposed faces to contain any of various selected electrical devices, or combinations thereof, such as switches, receptacles, illuminated screens or panels, and the like. Thus as illustrative, but without limitation, FIG. 1 shows the electrical device combination to comprise a switch 18, illuminated screen 19 and grounded receptacle 20. As will be understood, the electrical devices per se are selectable from various available types and constructions to which current may be supplied by electrical leads, not shown, brought into the box 16 through its opening 16a and attachable to appropriate binding posts or terminal screws 21. Each of the module bodies has a flanged rectangular, most desirably square, head 22 bearing at its inner surface 23 against the surface of the strap 15 which is apertured at 24 within the bearing surfaces to pass the inner extents of the module bodies. As viewed in FIG. 1 the exposed module flanges 22 are of essentially square configuration and have their adjacent transverse edges at 25 in substantially contacting or abutting relation, any slight clearances allowed desirably being kept within about 0.010 inch. Thus the module flanges are in essentially continuous sequence and interengage or are interengageable to prevent relative displacements which might otherwise result because of substantially spaced relation of the modules. The module series is peripherally confined by interengagement or with only correspondingly slight clearances, between the sides of the module flanges with the longitudinal face plate slot edges 26, and the engagement of the end modules with their edges 27 of the slot. Thus the module series and face plate assembly because of the described bearing relationships, becomes self-locking against relative shifting within and in the direction of the plane of the face plate.

Each of the electrical device receiving cavities in each module is peripherally defined by the inner square edges 27 of inwardly beveled surfaces 28 of the flange 22, the bevel continuing to a crest 29 raised somewhat beyond the wall plate surface and beyond which the flange is reversely beveled at 30.

Referring to FIGS. 2 to 4, the sides of the module bodies are shaped to present shoulders 31 for retention of the bodies by the strap against outward displacement within the face plate slot. Such retention is accomplished by providing the strap with integral upstanding localized flanges 32 containing deflectable tongues 33 which by screwdriver or other implement may be bent inwardly toward the modules in overlapping engagement with the body shoulders 31. As a result of the tongue deflections the module flanges 22 become securely locked in bearing engagement with the outer surfaces of the strap, thus completing retention of the modules against displacement in any direction.

The variational form of the invention illustrated in FIGS. 5 and 6 contemplates a plural module sequence, typically two modules, wherein the module body retention is effected by deflectable end, as distinguished from side, portions of the strap. Here the module bodies 35 rectangularly flanged at 36 with the flanges having inwardly beveled faces 37, are accommodated in edge-to-edge engagement or with only slight clearances at 38, withing opening or slots 39 and strap 40. The outer and inner opposed sides of the flanges 36 overlap and engage the raised outer strap surfaces at 41 and bear against projections 42 struck outwardly from the strap at one or more locations between openings 39 and the contained modules. Here the module bodies are molded to present shoulders 43 engageable by the strap tongues 44 which may be deflected from non-projecting condition into overlapping engagement with the surfaces 43 by turning of a driver or other tool within the strap slot configurations indicated at 45. As before, the module flanges 36 are peripherally confined by their engageability with the face plate slot edges 46 and 47.

We claim:
1. The combination comprising a face plate having therein an elongated slot, a mounting strap at the rear of said plate, and a succession of electrical device module bodies carried by and bearing against said strap and having flanged rectangular heads alined in substantially edge-to-edge engagement within said slot to be self-locking against relative shifting within and in the direction of the plane of the face plate.
2. The combination of claim 1, in which opposite side and end edges of the head series substantially engage the side and end edges of said slot.
3. The combination of claim 1, in which said heads are square and have outer recessed faces defining areas for the accommodation of electrical devices contained in the bodies.
4. The combination of claim 1, in which the sides of said bodies have shoulder surfaces and the strap includes locking means engaged with said surfaces to hold said heads against the strap.
5. The combination of claim 4, in which the strap contains rectangular openings individually receiving said bodies and said locking means are positioned at the sides of said openings.
6. The combination of claim 5, in which said locking means comprise tabs formed integrally with the strap and bendable to overlap said surfaces.
7. The combination of claim 6, in which the plate slot contains the square heads of at least three module bodies and in which the bodies are held against turning by inter-engagement of their heads and engagement of the heads with edges of the slot.
8. The combination of claim 7, in which said heads have squarely recessed outer faces defining areas for the accommodation of electrical devices contained in the bodies.

References Cited

UNITED STATES PATENTS

| | | | |
|---|---|---|---|
| 1,992,059 | 2/1935 | Despard | 174—53 |
| 2,029,716 | 2/1936 | Hartmann | 339—133 |

FOREIGN PATENTS

| | | |
|---|---|---|
| 1,274,117 | 9/1961 | France. |

LEWIS H. MYERS, *Primary Examiner.*

DAVID A. TONE, *Assistant Examiner.*

U.S. Cl. X.R.

220—24.2